Sept. 26, 1967 A. BOTTANI 3,344,240

ADJUSTABLE PICKUP DEVICE FOR OPTICAL SOUND TRACK

Filed July 18, 1966 4 Sheets-Sheet 1

INVENTOR
ANGELO BOTTANI
BY
Hubbell, Cohen & Stiefel
ATTORNEYS.

Inventor
ANGELO BOTTANI
By Hubbell, Cohen & Stiefel
Attorneys

Sept. 26, 1967 A. BOTTANI 3,344,240

ADJUSTABLE PICKUP DEVICE FOR OPTICAL SOUND TRACK

Filed July 18, 1966

4 Sheets-Sheet 3

Inventor
ANGELO BOTTANI
By Hubbell, Cohen & Stiefel
Attorneys

INVENTOR
ANGELO BOTTANI
BY Hubbell, Cohen & Stiefel
ATTORNEYS.

3,344,240
ADJUSTABLE PICKUP DEVICE FOR OPTICAL SOUND TRACK

Angelo Bottani, Milan, Italy, assignor to Societa Internazionale Fonovisione S.p.A., Milan, Italy, a corporation of Italy Filed July 18, 1966, Ser. No. 568,699
Claims priority, application Italy, June 14, 1962, 721,379/62; Oct. 16, 1965, 23,138/65, Patent 669,953
13 Claims. (Cl. 179—100.3)

This application is a continuation-in-part of my application Ser. No. 251,146, filed Jan. 14, 1963 now abandoned.

The present invention relates in general to a device for reproducing the optical sound track of a film, and more specifically to a pickup device for use in a sound production apparatus as for example a juke box and the like which is capable of simultaneously reproducing sound and pictures.

Heretofore, various methods have been used for the recording and reproduction of sound on film. The most widely used means for reproducing such sounds are the magnetic system and the optical system. The magnetic system is based on the principle of translation into permanent magnetic variations on either a wire or tape of suitable material, the variations of microphone currents, and thereupon reproducing these variations into an audio frequency as a function of the magnetic variations.

In the optical and photo-acoustic systems, however, a record of the sound is photographed on a film. In the case of an audio-visual apparatus, the film on which the sound is photographed may be either the same film on which the picture or action is recorded or else it can be separate film. Sound photographed on such film is then reproduced by means of photo-sensitive elements such as photodiodes, photoelectric cells, etc.

Up to the present time in sound reproduction apparatuses such as juke boxes or audio-visual sound reproduction apparatuses, e.g. those known under the trade name of "Cinebox," the magnetic system was employed for the recording of sound on film. The reproduction of such sounds is thus obtained by means of a magnetic head in direct contact with the magnetic sound strip of film moving below it. A disadvantage of sound reproduction by this method is that the head of necessity must exert a pressure on the film. As a result, the film tends to deteriorate or wear with use. This disadvantage is particularly aggravated when the film is subjected to repeated playbacks such as that which takes place in a juke box or the like.

Another drawback which the magnetic system has, is that in the event a single film is to serve for both the sound and visual reproduction, the very small sound strip constituting the magnetic track which is glued to one side of the film bearing the pictorial images must be balanced or compensated for by another column or strip of film of the same size applied to the other side of the film where the perforations are normally provided for driving the film. This compensation is required for balance in order to prevent the width of the added sound track from inducing a conical winding in the film strip during the showing thereof.

One of the many advantages which the optical system of sound reproduction has over the magnetic system of sound reproduction is that the optical sound films can be used for unlimited periods of time. Thus, the film of the optical system is not subjected to wear due to the fact that the pickup of the optical sound system does not touch or exert any pressure on the film at any point. However, the reproduction of the optical sound track of a film requires a precise adjustment or calibration of the optical members, namely, of the energizing lamp and the cooperating pickup lens which must concentrate a thin ray of light in an absolutely perfect manner onto the sound track.

Therefore, it is an object of this invention to provide in an optical sound reproduction system a relatively simple, yet sturdily constructed pickup device for supporting the lamp and associated pickup lens of the optical sound system.

Another object is to provide a pickup device or structure which can be readily attached to the apparatus on which it is to be mounted.

Still another object of the invention is to provide a pickup arrangement or means for effecting the adjustment or registration of the optical pickup lens together with its cooperative lamp so as to effectively center the luminous segment of the pickup lens on the optical sound track of the film.

Still another object of the invention is to provide for the adjustment or registration of the optical pickup together within its associated lamp so as to effect the focusing of the pickup lens with respect to the film.

Still another object is to provide the pickup arrangement with means for effecting adjustment or registration of the lamp with respect to its associated optical pickup lens.

Still another object of the invention is to provide the pickup arrangement with means for conveniently and rapidly replacing the lamp.

Still another object of the invention is to provide the pickup arrangement with means for replacing the lamp without affecting the registration of the lamp with respect to its associated pickup lens.

Still another object of the invention is the application of the instant structure to the sound and/or audio-visual reproduction apparatus, which structure may be operatively associated with either a fixed or movable part of the apparatus.

In accordance with this invention, the pickup device is characterized by the fact that it comprises a bracket means adapted for the attachment to an audio or audio-visual reproduction apparatus in the vicinity of the film travel. A member is coupled to the bracket in such a way as to be adjustable along and about a fixed axis. Adjustably carried by the member is a support member. Means are provided to effect perpendicular displacements of the support means with respect to the member on which it is carried. The support member in turn carries the optical pickup lens and its corresponding illuminating lamp. In accordance with this invention, the lamp is attached to the support means in a manner such that it can be adjusted relative to the pickup lens carried on the support member.

A feature of this invention resides in the provision of an optical pickup device which is relatively simple in structure and positive in operation.

Another feature resides in the provision wherein the optical pickup of this invention can be precisely adjusted with respect to the travel of the sound film.

Another feature resides in the provision wherein a burned out lamp can be replaced without the need to readjust the registration of the lamp with respect to its associated optical pickup lens.

Other features and advantages will become more readily apparent when considered in view of the specification and drawings, in which.

Figure 1:
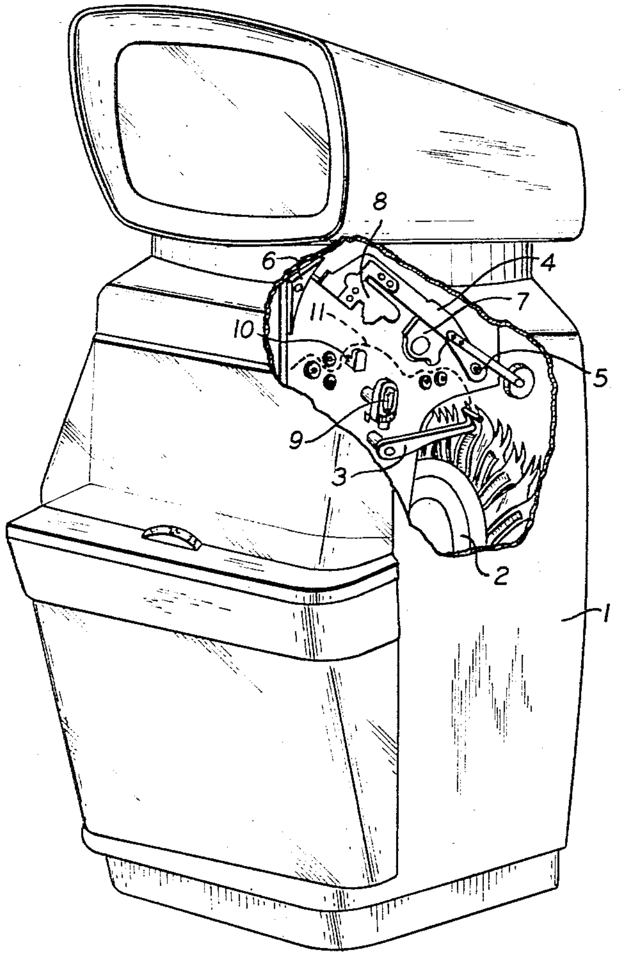
FIG. 1 is a perspective view of an audio-visual reproduction apparatus having portions thereof broken away to illustrate the relative relationship of the pickup device of this invention relative to the film travel therein.

Referring to the drawings, FIG. 1 illustrates an audio-visual reproduction apparatus in the form of a juke box 1. Disposed within the juke box 1 are films, one for each song to be played, supported by a wheel or drum 2. Associated with the drum 2 is a coupling arm 3 for selecting the film to be viewed, and operatively associated with the coupling arm is an oscillating arm 4 which is pivoted at one end about a fulcrum, and having its free end guided by a guide 6. In the illustrated embodiment, the visual projection device 7 is carried on arm 4, and operatively associated with the projection device 7 is a lamp 9.

In accordance with this invention, arm 4 also carries the pickup device 8 which forms the subject matter of the present invention. Operatively associated with the pickup device 8 is the stationary support 10 of a photosensitive element. As shown in FIG. 1, 11 represents the path which the film will assume during the projecting thereof at which the arm 3 is displaced to the left and arm 4 is lowered into operating position. A more detailed description of the apparatus 1 and of the operation thereof is not deemed necessary at this time for an understanding of the instant invention. However, for a more complete illustration and description of the apparatus 1 reference is made to a copending U.S. patent application, Ser. No. 845,985, filed Oct. 12, 1959, now U.S. Patent No. 3,081,668.

Referring more particularly to FIGS. 2, 3, 4 and 5, the pickup device 8 of this invention is optically associated with the support 10 of the photosensitive element. In accordance with this invention, the pickup device 8 is connected to the oscillating arm 4 of the apparatus. In the embodiment shown, the pickup device 8 includes a bracket means comprising a pair of attachment plates 12 and 13 which are arranged substantially in the same plane one above the other. Each of the bracket plates 12 and 13 is provided with holes 14 and 15 for receiving screws 16 and 17, by which the respective bracket plates 12 and 13 are securely fastened to arm 4. Each of the bracket plates 12 and 13 is provided with an aligned thickened or projecting portion 12*a* and 13*a*, each of which is provided with a hole 12*b* and 13*b*, respectively. Accordingly, the two bracket plates 12 and 13 constitute the first member of the pickup device, which as described, is adapted to be rigidly connected to arm 4. However, it will be understood that the bracket means is formed of two bracket plates 12 and 13 solely for the purposes of convenience in assembling, and that if desired, the bracket plates 12 and 13 may be formed as an integral unitary member. It is to be also understood that, if desired, the bracket member could be made an integral portion of the apparatus with the remaining components of the pickup device connected thereto in a manner which will be hereinafter described.

The second member of the pickup device comprises a plate block 19 which is adapted to be disposed between the projections or thickened portions 12*a* and 13*a* of the respective bracket plates 12 and 13. Accordingly, the plate block is provided with a vertically disposed bore 19*a*. As shown, the plate block 19 is disposed between the thickened portions 12*a* and 13*a* of the respective bracket plates so that the bore 19*a* of the plate block 19 is disposed in alignment with the respective openings 12*b* and 13*b* of the bracket plates. A pin 18 is extended through aligned opening 12*b*, 13*b* and bore 19*a* of the bracket plates 12, 13 and the plate block 19, respectively. In accordance with this invention, the hole 12*b* and bore 19*a* provided in the thickened portion of plate 12 and in block 19, respectively, are each provided with a diameter which is slightly greater than the diameter of the pin 18, while the hole 13*b* of the thickened portion of bracket plate 13 is internally threaded. Accordingly, the lower end of the pin 18 is provided with a threaded portion adapted to engage the corresponding threads of the opening 13*b*. This arrangement of the slightly larger diameters of holes 12*b* and 19*a*, as compared with the diameter of the pin 18, permits a free coupling of the block 19 with respect to the bracket plates 12 and 13. This, as will be hereinafter set forth, is provided to effect adjustment or relative movement between block 19 and the respective bracket plates 12 and 13. As shown, the block 19 is positioned between the projections of the bracket plate by means of a threaded stop or washer 20 on which the block 19 rests, and the block is normally biased against washer 20 by spring 21 mounted between the upper end of the block 19 and the upper projection 12*a*. In the illustrated embodiment, the spring 21 comprises a coil spring disposed about the pin 19. By this arrangement it is readily noted that the block is rendered vertically adjustable between projections 12*a* and 13*a* by rotating the adjusting pin 18. This rotation of the pin 18 effects lowering or raising the block 19 between projections 12*a* and 13*a* depending on the direction of rotation of pin 18.

In accordance with this invention, the block 19 is also provided with means to provide for limited angular rotation of the block 19 about the fixed longitudinal axis of pin 18 with respect to bracket means 12 and 13. This angular adjustment of block 19 about the axis of pin 18 is attained by balls 22 which are partly housed in the block 19, and disposed on either side of the pin 18. According to this invention the balls can be individually adjusted a limited extent toward or away from the block 19. That is, one ball may be adjusted to project inwardly or outwardly more than the other one from the block. Thus the relative displacement of the respective balls 22 permits the block 19 to move in planes which are slightly rotated or angularly disposed with respect to the plane parallel to the plate 13. The registering or adjustment of the respective balls 22 is effected by means of cooperating dowels 23 which are locked in position, after the registration has been effected, by corresponding lock nuts 24. With the block 19 mounted to the bracket plates 12 and 13 in the manner hereindescribed, it will be readily apparent that, by simply manipulating pin 18, the block 19 may be shifted in a linear direction along the axis of the pin 18 either in a parallel relationship with respect to bracket plate 13 or in a slightly angular relationship with respect thereto. More specifically, rotating the pin 18 in a clockwise or counterclockwise direction, will effect movement of the block 19 toward or away from the lower thickened portion 13*a* of bracket plate 13 depending upon the direction of rotation. Also it will be noted that the balls 22 permit relative movement between the block 19 and bracket plate 13 with a minimum of friction. While block 19 has been described as resting via balls 22 against plate 13, it will be obvious that block 19 could also rest against plate 12 or rest against both plates 12 and 13. In either case, it is necessary to provide a bearing surface which permits the block 19 to carry out displacements along given planes.

Connected to block 19 and adapted to be carried thereby is a third member or supporting means 25 which is also in the form of a plate structure. The supporting means 25 in turn constitutes the support for the pickup lens 26 and a corresponding lamp 43*b*. As shown, the supporting means 25, block 19, and the bracket plates 12 and 13 are each arranged substantially parallel to one another and one behind the other. In accordance with this invention, the support means 25 is connected to block 19 by means of two pins 27 which are perpendicularly secured to the block 19 at one end and which have their extended or free end portion passing freely through holes 25a and support 25. In order to secure the support 25 to the pins 27, each of the pins is provided with a head or stop consisting of a washer 31 anchored to the free end of the pin. Between the washer 31 and the supporting means or plate 25 and about each of the pins 27 there is mounted a coil spring 32. By mounting the support 25 in the manner described, the support 25 is able to follow the block 19 during the displacement effected by the adjustment or rotation of pin 18. In accordance with this invention, the support 25 is rendered adjustable relative to the block 19 on which it is carried. This is attained by means of an adjusting screw 28 which passes through a hole 29 in the support 25 at a position between and parallel to pins 27. Accordingly, the hole 29 through which the adjusting screw 28 passes is provided with internal threads, and the inner end of the adjusting screw is provided with a disc shaped head or boss 30 which is arranged to bear against block 19. Thus, it will be apparent that rotation of the adjusting screw 28 will effect movement of the support 25, which is slidably mounted on pins 27, toward or away from the block 19, and which movement is yieldingly resisted by the actions of springs 32 disposed about pins 27. Of course, by a reversal of parts, such motion could be assisted by springs. If desired, a dowel or set screw 33 is provided to lock the support means 25 on pins 27 in the desired adjusted position thereof with respect to block 19.

Figure 2:
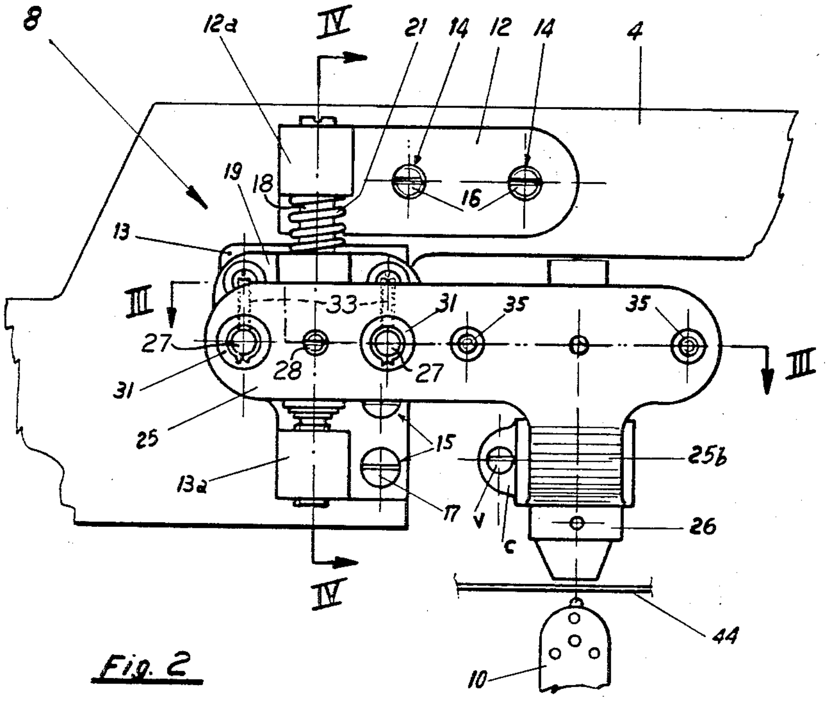
FIG. 2 is a front view of one embodiment of the pickup device of this invention.
Figure 3:
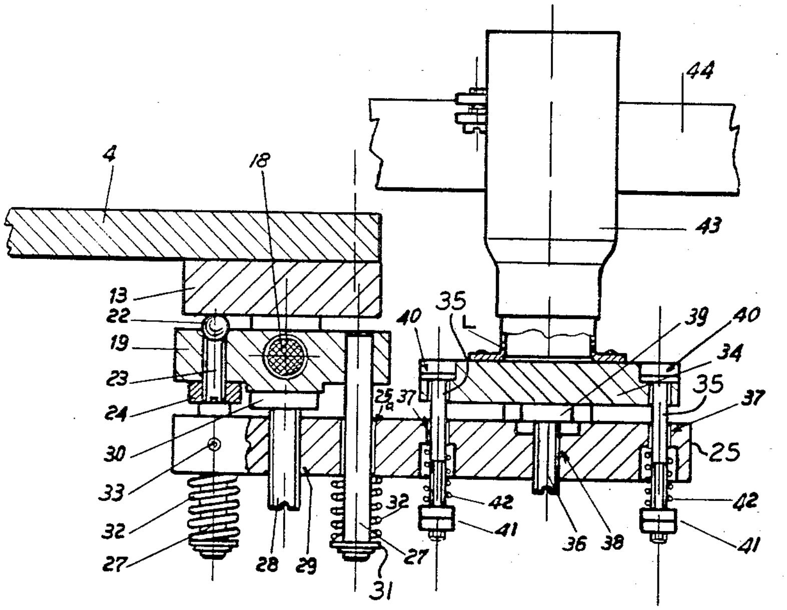
FIG. 3 is a sectional view taken along line 3—3 of FIG. 2.
Figure 4:
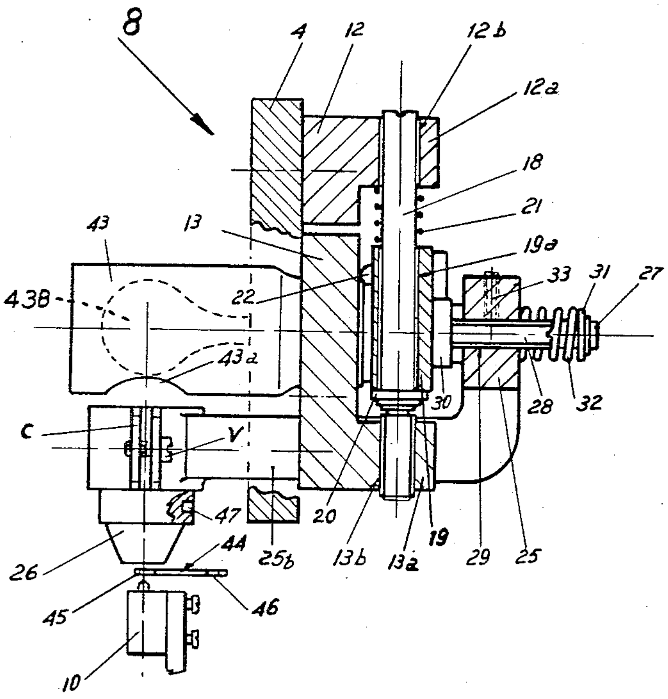
FIG. 4 is a sectional view taken along line 4—4 of FIG. 2.
Figure 5:
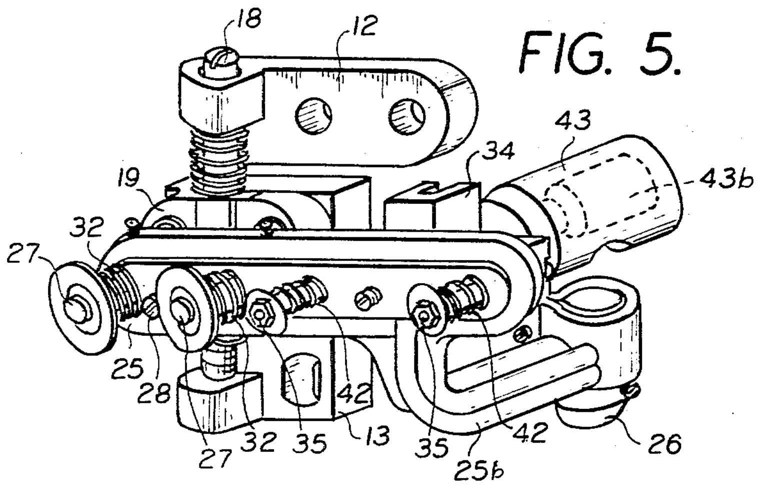
FIG. 5 is a perspective view of the pickup device shown in FIGS. 2–4.

As shown in FIGS. 2 and 4, the support means 25 is provided with an angularly offset depending arm 25b which is adapted to support the pickup lens 26 by means of a split collar or ring C connected to the free end of arm 25b. The split collar can be readily adjusted by means of a screw V. Above and parallel to the arm 25b the support means 25 is provided with a lamp holder L (see FIG. 3) by which lamp 43b is carried. According to the embodiment of the invention here illustrated, the lamp holder comprises a block of insulating material 34, as for example, Bakelite, and the system or means for connecting the lamp holder block 34 to the supporting means 25 is very similar to means hereinbefore described for adjustably connecting the support means 25 to block 19. As seen in FIG. 3, the block 34 is connected to the supporting means 25 by means of a pair of pins 35 which freely extend through appropriate openings 37 in support 25. As shown, each pin 35 is fixed at one end to the insulating block 34 and has its free end extending through hole 37 provided for receiving the same in the support member 25. The outer ends of the respective pins 35 are provided with a stop nut 41. Coil springs 42 are disposed about the pins 35 between the stop nut 41 and the support means 25 for normally exerting a bias for urging the lamp holder block 34 toward the support 25. In accordance with this invention, means are provided for effecting relative adjustment between the insulating block 34 and the support means 25. This latter means comprises an adjusting screw 36 which is threaded into a threaded opening 38 in support member 25.

As hereinbefore described, the inner end of the adjusting screw 36 is provided with an enlarged portion 39 which is adapted to bear against the insulating block 34. Thus, rotation of the adjusting screw 36 in one direction or the other will effect adjustment of the supporting block 34 toward or away from the supporting means depending on the direction of rotation of the adjusting screw 36. Thus, by manipulating the screw 36, and depending upon the direction of rotation thereof, the block 34 and therefore the lamp holder L together with the lamp 43b therein are adjusted parallel toward or away from the support 25. This adjustment therefore renders it possible to displace the lamp 43b along the axis of the screw 36 in order to cause it to assume the optimum position of illumination with respect to the pickup lens 26 fixed to arm 25b.

The lamp is protected by a casing or shade 43 which is provided with an opening 43a to permit the passage of light in the direction of the pickup lens.

As seen in FIGS. 2 and 4, the film 44, provided with the optical sound track, is arranged to pass between the pickup lens 26 and a photosensitive element which is borne by the adjustable support 10. Accordingly the film 44 is on a plane normal to the adjustment pin 18 and moves along a direction perpendicular to the other two adjusting screws 28 and 36.

From the foregoing description, it will be readily apparent that it will be possible by means of the various adjustments provided, in accordance with this invention, to calibrate the pickup device either during assembly of the unit or when the necessity arises, whereby the respective members may be precisely positioned to assure the optimum reading or reproduction of the sound track.

Assuming that the film 44 as seen in FIG. 4 has an optical sound track 45 and perforations at 46, the recording must be effected in such a manner that the pickup lens 26 concentrates the beam of light of the lamp on the optical sound track in the most effective manner. From the foregoing description, it will be apparent that the micrometric adjustment of the optical apparatus described is readily obtained. The component parts which permit micrometric adjustments of the optical device 8 are:

The screw 36, which displaces the lamp, independently of the pickup lens, bringing the center of the filament into exact coincidence with the axis of the pickup lens. Normally this screw is the first to be operated in the adjustment of the structure.

The screw 18, which serves to raise or lower the lamp and the pickup lens at the same time for the focusing of the latter with respect to the film.

The grip 47, which makes possible, by suitable means, the rotation of the pickup lens around its own axis and therefore the displacement of the luminous segment of the latter transversely with respect to the film.

The screw 28, which permits the lamp and the pickup lens to be displaced at the same time transversely with respect to the film, so as to center the segment of the pickup lens precisely on the optical sound track. In addition to the said members, there can also be adjusted one of the dowels 23 so as to cause, within narrow limits, the rotation of the entire adjustable part of the structure around the pin 18 in the event that it is necessary to reestablish perfect perpendicularity between the axis of the screw 36 (and 28) and the direction of displacement of the film below the pickup lens or (see FIG. 3) between the lamp holder with lamp and the film.

While, as discussed hereinbefore, the embodiment illustrated in FIGS. 2–5 provides a marked advance over the prior art, some inconvenience may be experienced if it becomes necessary often to change the lamp 43b, for instance when it burns out, and the lamp holder block 34 must be removed from the device due to lack of maneuvering space. In the embodiment illustrated in FIGS. 2–5, this involves removal of nuts 41 and pins 35 as well as adjusting screw 36. Each time a lamp is replaced it therefore becomes necessary to readjust the position of lamp 43b relative to pickup lens 26 by means of adjustment screw 36. Such replacement often requires readjustment and recalibration of the system.

Figures 6, 7, 8:
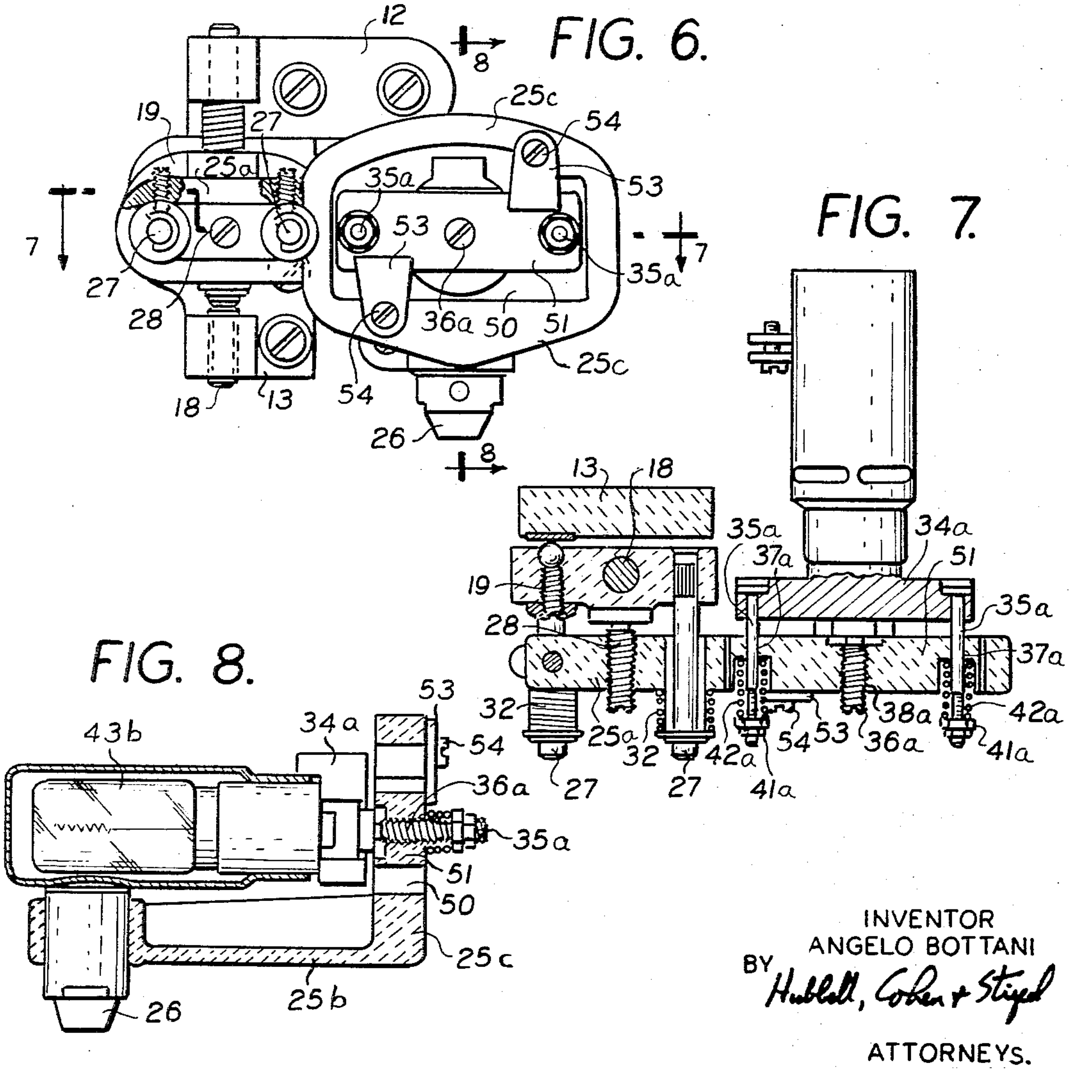
FIG. 6 is a front view of another embodiment of the pickup device of this invention.
FIG. 7 is a sectional view taken along the line 7—7 of FIG. 6.
FIG. 8 is a sectional view taken along the line 8—8 of FIG. 6.

This need for readjustment or recalibration is eliminated by the modified construction of the presently preferred embodiment of the invention illustrated in FIGS. 6–8, wherein like parts are given like reference numerals. In accordance with this embodiment of the invention, the support member 25 has been modified and provided with a cut-out portion for receiving the lamp holder. By virtue of this cut-out, the adjustment screw 36 is not disturbed when the lamp holder is removed to change a lamp. Accordingly, when the lamp holder is replaced on the support the new lamp remains in registry with the pickup lens 26, eliminating need for repeating the adjustment of the lamp relative to the pickup lens each time a lamp is replaced.

Referring particularly to FIGS. 6–8, the support 25*a* is provided with a cut-out 50 defined by wall member 25*c* and adapted to receive a block 51 which in turn constitutes the support for lamp holder block 34*a*. Block 51 is provided with flanges 53 which are connected to wall member 25*c* by means of screws 54 which extend into threaded openings in member 25*c* adapted to receive screws 54. Pickup lens support 25*b* extends from the lower portion of wall member 25*c*.

Lamp holder block 34*a* is fastened to block 51 in essentially the same manner as block 34 is attached to support 25 in the embodiment illustrated in FIGS. 2–5. That is, as seen in FIG. 7, the block 34 is connected to the block 51 by means of a pair of pins 35*a* which freely extend through appropriate openings 37*a* in block 51. Each pin 35*a* is fixed at one end to the insulating block 34*a* and has its free end extending through hole 37*a*. The outer ends of the pins 35*a* are provided with stop nuts 41*a*. Coil springs 42*a* are disposed about the pins 35*a* between the stop nut 41*a* and the block 51 for normally exerting a bias for urging the lamp holder block 34*a* toward the block 51*a* and the support wall means 25*c*.

Adjusting screw 36*a* is threaded into a threaded opening 38*a* in block 51 to provide means for effecting relative adjustment between the insulating block 34*a* and the support block 51.

It will be seen that, with the modified arrangement of FIGS. 6–8, when it becomes necessary to replace the lamp, all that is required is to loosen screws 54, extract block 51 from cut-out 50, replace the lamp, reposition block 51 in cut-out 50 and tighten screws 54. Besides providing simpler means for removing the lamp holder to replace a lamp, this modified construction thus obviates the need to manipulate pins 35*a* or adjusting screw 36*a* since the entire block 51 on which they are mounted is removed. This, in turn, removes the need to recalibrate the adjustment between the lamp 43*b* and the pickup lens 26, for when block 51 is refastened to support wall 25*c* by tightening screws 54, the lamp assembly assumes precisely the same position relative to the pickup lens 26 which it had before the removal of block 51.

The invention has been described and illustrated by way of example with reference to specific embodiments of construction and in connection with a structure mounted on the movable pressure arm 4 of an audio-visual reproduction apparatus. It will however be obvious to those skilled in the art that the structural details as wall as the mounting and application of the structure, may vary without thereby going beyond the spirit or purpose of the invention. In particular, the structure, instead of being borne by the pressure arm of the apparatus shown, can be associated with the movement of said arm. In the case of apparatus of different type, the structure could also be associated with the movable parts or be fixed.

What is claimed is:

1. A pickup device for an apparatus of the class consisting of audio and audio-visual production apparatus, comprising a bracket means adapted to be mounted on said apparatus adjacent a film strip carrying a sound record, said bracket means having spaced projecting portions provided with aligned openings therein, a block having a bore therethrough disposed between said projections, said bore being disposed in alignment with said openings, a pivot pin extending through said bore and aligned openings for connecting said block to said bracket whereby said pin defines an axis permitting relative linear movement between said bracket means and block, spring means disposed between said block and a projecting portion of said bracket for yieldingly resisting linear movement therebetween, means operatively associated between said bracket and block for permitting limited angular movement of said block about said axis, a support means carried by said block, means for adjusting the relative perpendicular distance between said block and said support means, a pickup lens and a cooperating lamp carried by said support means, and means for adjusting said lamp relative to said pickup lens.

2. The invention as defined in claim 1 wherein said means for permitting limited angular movement of said block about said axis includes a ball housed in said block on either side of said axis, and means for adjusting the variable extent each of said balls projects from said block.

3. The invention as defined in claim 2 wherein said bracket means includes a pair of spaced bracket plates vertically disposed one above the other in a common plane and the balls housed in said block are disposed in contact with at least one of said plates.

4. The invention as defined in claim 1 wherein said support means has a pair of holes formed therein and said means for adjusting the perpendicular distance between said block and said support means comprises a pair of guide pins secured to said block and disposed at right angles with respect to said pivot pin, said guide pins being freely extended through said holes in said support means, spring means normally urging said block and support means toward one another, and an adjusting screw threaded to said support member and bearing on said block whereby rotation of said adjusting screws effects adjustment between said support means and said block.

5. The invention as defined in claim 4, further including means for locking said support means in adjusted position.

6. The invention as defined in claim 4 wherein said support means is provided with an angled arm, said pickup lens being connected to said arm, and said means for adjusting said lamp relative to said lens includes a lamp holder, a pair of lamp guide pins connected to said lamp holder freely extended through said holes in said support means, spring means for biasing said lamp holder and support means toward one another, and an adjusting screw for effecting adjustment of said lamp holders relative to said support means and lens carried thereon.

7. The invention as defined in claim 6 wherein the pivot pin, the respective adjusting screw between the supporting means and said block and said lamp holder are disposed substantially perpendicular to the plane of the film and to its direction of displacement respectively while it is under the pickup lens.

8. A pickup device for an apparatus of the class consisting of audio and audio-visual production apparatus, comprising a bracket means adapted to be mounted on said apparatus adjacent a film strip carrying a sound record, said bracket means including an upper bracket plate and a spaced lower bracket plate, each of said bracket plates being provided with spaced projecting portions provided with aligned openings therein, a block having a bore therethrough disposed between said projections, said bore being disposed in alignment with said openings, the opening in said lower bracket plate being provided with internal threads, a pivot pin adapted to extend through said bore and aligned openings of said bracket plates for connecting said block to said bracket means, said pivot pin having an externally threaded lower end adapted to screw into the threaded opening of said lower bracket plate, a stop connected to said pin on which said block is adapted to rest, and said pivot pin having a diameter slightly less than the diameter of said bore and hole in said upper bracket plate so that said pivot pin defines an axis permitting relative linear movement of said block between the projections portions of said bracket means upon rotation of said pivot pin, spring means disposed between said block and a projecting portion of said upper bracket plate for yieldingly resisting linear movement therebetween, means operatively associated between said bracket means and block for permitting limited angular movement of said block about said axis, said latter means including balls housed in said block and disposed on opposite sides of said pivot pin, means for individually adjusting the variable extent each ball projects from said block, a support means, means for carrying said support means on said block, said latter means including a pair of guide pins connected to said block and disposed perpendicular thereto, said guide pins being freely receivable in holes formed in said support means, spring means disposed about said guide pins for biasing said block and support means toward one another, means for adjusting the relative perpendicular distance between said block and support means, a pickup lens and a cooperating lamp carried by said support means, and means for adjusting said lamp relative to said pickup lens.

9. A pickup device for an apparatus of the class consisting of audio and audio-visual production apparatus, comprising a bracket means adapted to be mounted on said apparatus adjacent a film strip carrying a sound record, said bracket means including an upper bracket plate and a spaced lower bracket plate, each of said bracket plates being provided with spaced projecting portions provided with aligned openings therein, a block having a bore therethrough disposed between said projections, said bore being disposed in alignment with said openings, the opening in said lower bracket plate being provided with internal threads, a pivot pin adapted to extend through said bore and aligned openings of said bracket plates for connecting said block to said bracket means, said pivot pin having an externally threaded lower end adapted to screw into the threaded opening of said lower bracket plate, a stop connected to said pivot pin for supporting said block thereon, said pivot pin having a diameter slightly less than the diameter of said bore and hole in said upper bracket plate so that said pivot pin defines an axis permitting relative linear movement of said block between the projecting portions of said bracket means upon rotation of said pivot pin, spring means disposed between said block and a projecting portion of said upper bracket plate for yieldingly resisting linear movement therebetween, means operatively associated between said bracket means and block for permitting limited angular movement of said block about said axis, said latter means including balls housed in said block and disposed on opposite sides of said pivot pin, means for individually adjusting the variable extent each ball projects from said block, a support means, means for carrying said support means on said block, said latter means including a pair of guide pins connected to said block and disposed perpendicular thereto, said guide pins having their free ends freely receivable in holes formed in said support means, spring means disposed about said guide pins for biasing said block and support means toward one another, means for adjusting the relative perpendicular distance between said block and support means, a pickup lens carried by said support means, a lamp support carried on said support means in cooperative relationship to said pickup lens, said lamp support including a lamp holder block, means for carrying said lamp holder block on said support means including a pair of guide pins connected to said support means and disposed perpendicular thereto, said guide pins having their free ends extended through openings in said support means, a set screw for adjusting the perpendicular distance between said lamp holder block and said support means, and a lamp carried on said lamp holder block.

10. The invention as defined in claim 1 wherein said support means comprises wall means defining an opening therebetween, an angled arm affixed to said wall means, said pickup lens being connected to said arm, a support block adapted to be received in said opening, said support block having a pair of holes formed therein, means for removably attaching said support block to said wall means, said means for adjusting said lamp relative to said lens including a lamp holder, and a pair of lamp guide pins connected to said lamp holder and freely extending through said holes in said support block for affixing said lamp holder to said support block.

11. The invention as defined in claim 10 further comprising spring means for biasing said lamp holder and support block toward one another and an adjustment screw engaging said support block and said lamp holder for effecting adjustment of said lamp holder relative to said support means and pickup lens carried thereon.

12. The invention as defined in claim 10 wherein said means for removably attaching said support block to said wall means comprises a pair of flanges on said support block and screw means for fastening said flanges to said wall means.

13. The invention as defined in claim 10 wherein said opening is peripherally continuous within said wall means.

References Cited

UNITED STATES PATENTS

| | | | |
|---|---|---|---|
| 2,508,888 | 5/1950 | Pettus et al. | 179—100.3 |
| 2,771,003 | 11/1956 | Lyndall et al. | 88—57 |

BERNARD KONICK, *Primary Examiner.*

V. P. CANNEY, *Assistant Examiner.*